United States Patent [19]

Lehmann

[11] 4,154,078
[45] May 15, 1979

[54] ROLLING MILL

[75] Inventor: Rolf Lehmann, Rudolfstetten, Switzerland

[73] Assignee: Escher Wyss Limited, Zurich, Switzerland

[21] Appl. No.: 841,703

[22] Filed: Oct. 13, 1977

[30] Foreign Application Priority Data

Oct. 21, 1976 [CH] Switzerland ............... 013303/76

[51] Int. Cl.² ......................................... B21B 27/10
[52] U.S. Cl. ................................. 72/201; 100/93 RP
[58] Field of Search .............. 72/245, 201, 241, 242; 29/527.7, 527.1–527.5, 419 R, 419 G, 420, 420.5; 100/93 RP, 160, 176; 75/226; 264/111, 175; 164/443, 444, 89

[56] References Cited

U.S. PATENT DOCUMENTS

| 3,359,100 | 12/1967 | Claus et al. ............... 75/226 X |
| 3,647,621 | 3/1972 | Schiel ............................. 100/160 |
| 4,041,752 | 8/1977 | Dolene et al. ................. 72/201 |

Primary Examiner—Milton S. Mehr
Attorney, Agent, or Firm—Robert A. Ostmann

[57] ABSTRACT

Rolling mill for the rolling of materials in sheet form, having two working rolls between which the material is rolled, and for each working roll a supporting roll, a hydraulic medium holding the working rolls in position; the axes of the two working rolls being situated substantially in an at least approximately horizontal plane, and the rolled material being taken downwards from above through the gap between the working rolls.

3 Claims, 2 Drawing Figures

ROLLING MILL

BACKGROUND OF THE INVENTION

The invention relates to a rolling mill for the rolling of material in the form of a long sheet, having two working rolls between which the material is rolled and which are supported on a supporting roll, the working rolls being held in position by a hydraulic medium.

A rolling mill of this kind has been proposed in U.S. patent application Ser. No. 655,767 filed Feb. 6, 1976, FIG. 3, now U.S. Pat. No. 4,059,976, granted Nov. 29, 1977.

But in that rolling mill the hydraulic medium acting on the surface of the working rolls reaches the rolled sheet of material.

SUMMARY OF THE INVENTION

The invention has as its object to provide a rolling mill wherein the hydraulic medium acting on the working roll does not reach the sheet of material after the latter has issued from the gap between the two working rolls, so that a rolled product of higher quality is obtained.

In a rolling mill of the type described initially the object specified is achieved according to the invention in that the axes of the two working rolls are situated substantially in an at least approximately horizontal plane and the rolled material is taken from above in a downward direction through the rolling gap.

Advantageously there are arranged below the two working rolls two collecting troughs for the hydraulic medium acting on the working rolls, the said collecting troughs leaving free between one another a gap for the rolled sheet of material.

Advantageously the edges of the two collecting troughs extend into the vicinity of the rolling gap, a gap being left free on the one hand between the edges and the rolled material sheet and on the other hand between the edges and the working rolls.

BRIEF DESCRIPTION OF THE DRAWINGS

A constructional example of a rollng mill according to the invention is shown in a simplified manner in the drawings by means of which the invention will be explained in detail.

In these drawings.

DESCRIPTION OF THE PREFERRED EMBODIMENT

Figure 1:
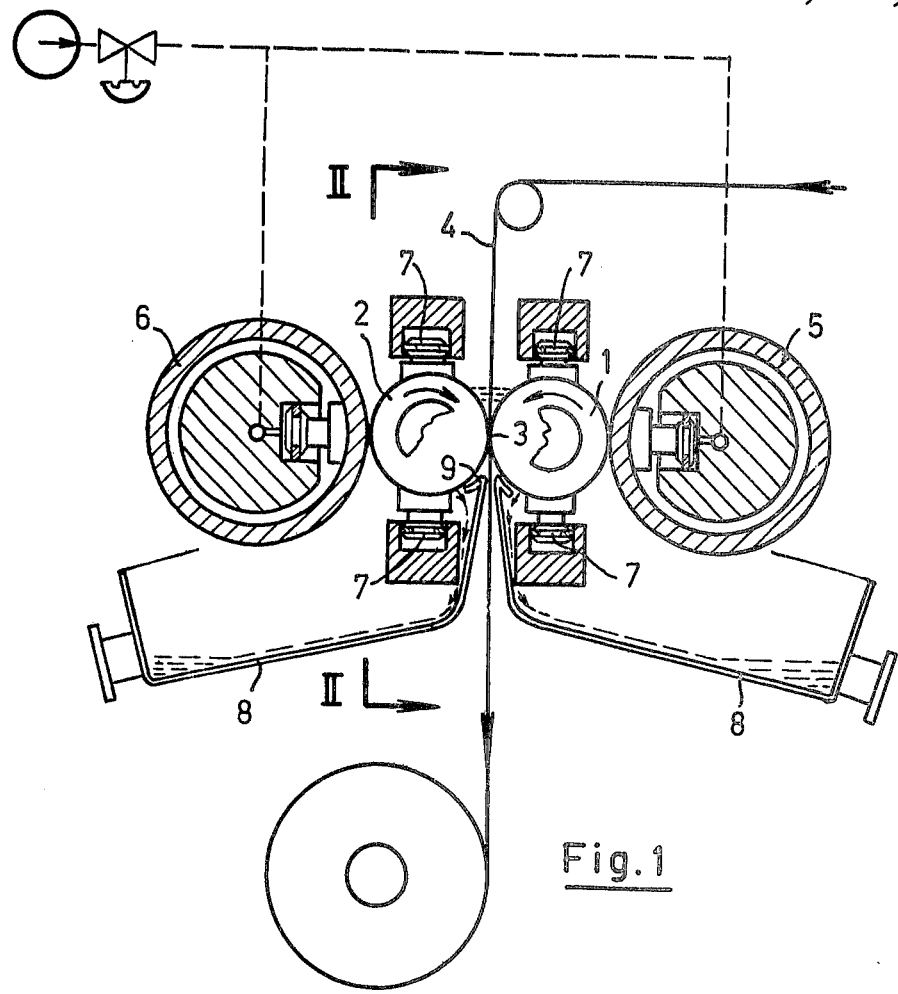
FIG. 1 shows a vertical cross section through a rolling mill.
Figure 2:
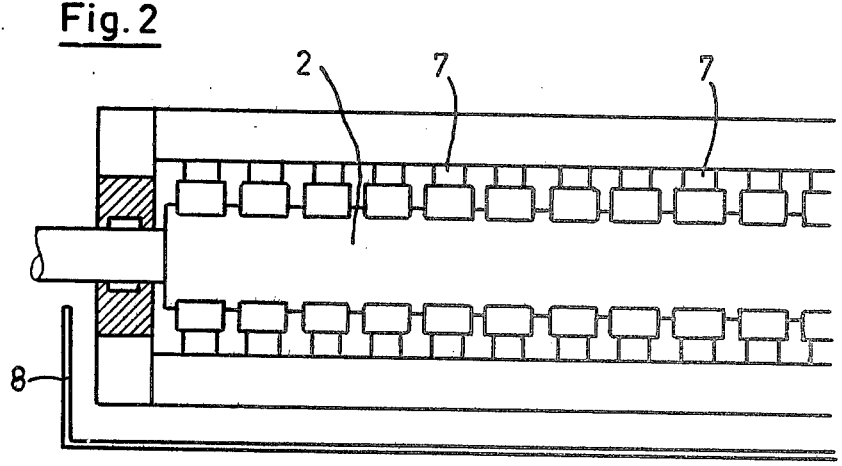
FIG. 2 shows a section taken on the line II—II of FIG. 1.

The rolling mill illustrated comprises two working rolls 1 and 2 which form between themselves a rolling gap 3 in which a sheet of material 4 is rolled. The two working rolls 1 and 2 are supported by means of supporting rolls 5 and 6. These are constructed as deflection compensation rolls, one in accordance with U.S. Pat. No. 3,802,044 and the other in accordance with U.S. Pat. No. 3,885,283.

Each of the two working rolls 1 and 2 is held in position, i.e. is supported from above and below by a hydrostatic supporting device 7. Between the shoe of the supporting devices 7 which cooperates with the particular working roll 1 or 2 respectively, and the working roll, there is formed a cushion of liquid constituted by a hydraulic medium, and by means of this cushion the supporting device 7 exerts a pressure on the working roll. The hydraulic medium is also used as a collant for the working roll.

The axes of the two working rolls 1 and 2 are situated in a horizontal plane and the rolled sheet of material is taken downwardly from above through the rolling gap 3.

Because of this arrangement, the hydraulic medium issuing from the gap between the shoes of the supporting device 7 and the working rolls 1 and 2 forms a sump of liquid only at the inlet side of the rolling gap 3. No liquid, however, can form at the outlet side of the rolling gap. The reason is that the hydraulic medium issuing from the gap between the shoes of the lower supporting devices 7 and the working rolls 1 and 2 flows downwards because of gravitational force; in addition the surfaces of the working rolls 1 and 2 also run downwards at the outlet side of the rolling gap 3.

To collect the hydraulic medium flowing away in a downward direction, collecting troughs 8 are situated below the lower supporting devices 7. Those edges of these two troughs 8 which are directed towards one another extend into the vicinity of the rolling gap 3, but do not contact either the rolled material sheet 4 or the two working rolls 1 and 2. There is provided at the edge of the troughs 8 a sealing strip 9 which leaves free a, in the circumferential direction of the roll, long gap of small width between itself and the working roll. Because of the rotation of the working roll a movement of air is brought about towards the interior of the trough in the gap.

In this way the sheet of material which has been rolled remains satisfactorily dry as it issues for the rolling gap 3.

I claim:

1. A rolling mill for material in sheet form including two working rolls which define a roll gap for the sheet material and each of which rolls has coacting supporting means comprising hydrostatic support apparatus which applies hydraulic medium directly to its surface, and characterized in that the axes of the working rolls lie in a plane which is at least approximately horizontal; by means which causes the material to be rolled to pass downward through the roll gap; and by a pair of collecting troughs for hydraulic medium located below the working rolls and spaced apart so that the material issuing from the roll gap passes between them, whereby said hydraulic medium does not contact the sheet material after the latter issues from the roll gap.

2. A rolling mill as defined in claim 1 in which each trough has an edge which extends into the vicinity of the roll gap and is spaced from both the rolled sheet material and the associated working roll.

3. A rolling mill as defined in claim 2 in which, at said edge, each trough is provided with a sealing strip which defines an elongated narrow gap which extends circumferentially with respect to the associated working roll.

* * * * *